United States Patent [19]

Carlton

[11] Patent Number: 5,622,116
[45] Date of Patent: Apr. 22, 1997

[54] COIL TRANSPORT TRAILER

[76] Inventor: Jerry W. Carlton, 3829 Pioneer Trail, Mantua, Ohio 44255

[21] Appl. No.: 545,530

[22] Filed: Nov. 21, 1995

Related U.S. Application Data

[63] Continuation of Ser. No. 18,315, Feb. 16, 1993, abandoned.

[51] Int. Cl.$^6$ .................................................. B60P 7/00
[52] U.S. Cl. ....................... 105/355; 105/377.05; 296/25; 410/48; 410/49; 410/50
[58] Field of Search ................................. 105/158.2, 355, 105/377.01, 377.05, 377.06, 377.1, 404, 413, 418, 419, 422; 410/47, 48, 49, 50; 296/25, 182

[56] References Cited

U.S. PATENT DOCUMENTS

| | | |
|---|---|---|
| 1,125,056 | 1/1915 | Buchanan . |
| 1,934,929 | 11/1933 | Jonsson . |
| 2,728,115 | 12/1955 | Cornelius . |
| 2,784,548 | 11/1957 | Butcher et al. ........................... 105/355 |
| 2,810,602 | 10/1957 | Abrams ................................... 296/182 |
| 2,851,964 | 9/1958 | Puckett . |
| 3,009,426 | 11/1961 | Nampa . |
| 3,186,357 | 6/1965 | Fillion . |
| 3,291,073 | 12/1966 | James . |
| 3,307,495 | 3/1967 | Chapman et al. . |
| 3,368,500 | 2/1968 | Raab et al. . |
| 3,460,684 | 8/1969 | Almasy . |
| 3,503,341 | 3/1970 | Widell et al. . |
| 3,581,674 | 6/1971 | O'Leary . |
| 3,753,407 | 8/1973 | Tilseth . |
| 3,807,759 | 4/1974 | Vornberger . |
| 3,829,148 | 8/1974 | Stoneburner . |
| 3,876,173 | 4/1975 | Cline . |
| 4,106,735 | 8/1978 | Partain et al. . |
| 4,204,479 | 5/1980 | Rosa . |
| 4,402,544 | 9/1983 | Artim et al. . |
| 4,474,359 | 10/1984 | Weaver . |
| 4,732,528 | 3/1988 | Good . |
| 4,806,065 | 2/1989 | Holt et al. ................................ 296/182 |
| 5,076,745 | 12/1991 | Klein . |
| 5,170,717 | 12/1992 | Richmond et al. . |
| 5,211,518 | 5/1993 | Mimica .................................... 296/182 |

OTHER PUBLICATIONS

V.K. Garg & R. V. Dukkipati, Dynamics Of Railway Vehicle Systems, pp. 76–79 (1984).
V.K. Garg & R. V. Dukkipati, Dynamics of Railway Vehicle Systems, pp. 348–361 (1984).
W.G. Raymond, H. E., Riggs & W.C Sadler, Elements of Railroad Engineering, pp. 91–96 (1947).
W.G. Raymond, H.E. Riggs & W.C Sadler, Elements of Railroad Engineering, pp. 102–103 (1947).
W.G. Raymond, H.E. Riggs & W.C Sadler, Elements of Railroad Engineering, pp. 210–215 (1947).
Car Builder's Dictionary and Cyclopedia, pp. 659–660 (1919).

*Primary Examiner*—Mark T. Le
*Attorney, Agent, or Firm*—Kathleen Anne Ryan

[57] ABSTRACT

A trailer (100) is provided that transports coils (20) in a trough formed by at least one pair of longitudinally extending spaced-apart support members (8,8') that extend upwardly away from each other towards the bed plane (BP) of trailer (100) such that a peripheral portion of coils (20) are engaged by support members (8,8') below bed plane (BP). Trailer (100) preferably includes containment structures (10, 10') to provide a cage-like structure about support members (8,8') and coils (20) and further preferably includes protective covering over coils (20) in the form of clam shell like sections (16, 16') as well as bar members (32) on opposite sides of each coil (20) that are operative to prevent coils (20) from telescoping.

20 Claims, 2 Drawing Sheets

5,622,116

COIL TRANSPORT TRAILER

This is a continuation of application Ser. No. 08/018,315, filed on Feb. 16, 1993 now abandoned.

This invention relates generally to a trailer for transporting coils such as sheet metal coils and more particularly where the coils are secured to support members in a trough such that a peripheral portion of each coil engages the support members below the bed plane of the trailer to enhance securement of the coils to the trailer.

BACKGROUND OF THE INVENTION

Coils, particularly heavy sheet metal coils, have been transported on flat bed trailers for many years and more recently on low boy or drop deck trailers where the trailer bed is lowered towards the ground between the front and rear wheel locations.

Heretofore, the coils have been secured to the top of the trailer bed or floor by chains or straps or the like in combination with blocking devices to keep them from rolling or sliding. Examples of various ways by which sheet metal coils have heretofore been secured to the top of the trailer bed are disclosed in U.S. Pat. Nos. 3,829,148; 4,106,735; and 4,474,359, the disclosures of which are incorporated herein by reference.

Heretofore, it has also been known to provide a protective covering over coils being transported by railroad cars or flat bed trailers to shield the coils from damage and contamination and to inhibit the formation of rust and the like. Examples of pivotable clam shell like covers used for covering coils are disclosed in U.S. Pat. Nos. 1,125,056; 1,934,929; 2,728,115; 2,851,964; 3,009,426; 3,503,341; and 4,402,544, the disclosures of which are incorporated herein by reference.

None of the covers however, have been used to protect coils secured in a trough of support members that engage a peripheral portion of each coil below the bed plane of the trailer transporting the coils as a means of lowering the center of gravity of coils being transported by trailers while enhancing securement of the coils to the trailer.

SUMMARY OF THE INVENTION

Accordingly, it is an object of this invention to provide a trailer for transporting coils.

It is another object of this invention to provide a flat bed type trailer for transporting coils in which the peripheral portion of each coil engages support members in a trough below the bed plane of the trailer.

It is still another object of this invention to provide a flat bed type trailer for transporting coils that are protected by a covering and have a peripheral portion engaging support members in a trough below the bed plane.

It is yet another object of this invention to lower the center of gravity of coils being transported by a trailer.

DESCRIPTION OF SOME PREFERRED EMBODIMENTS

Figure 1:
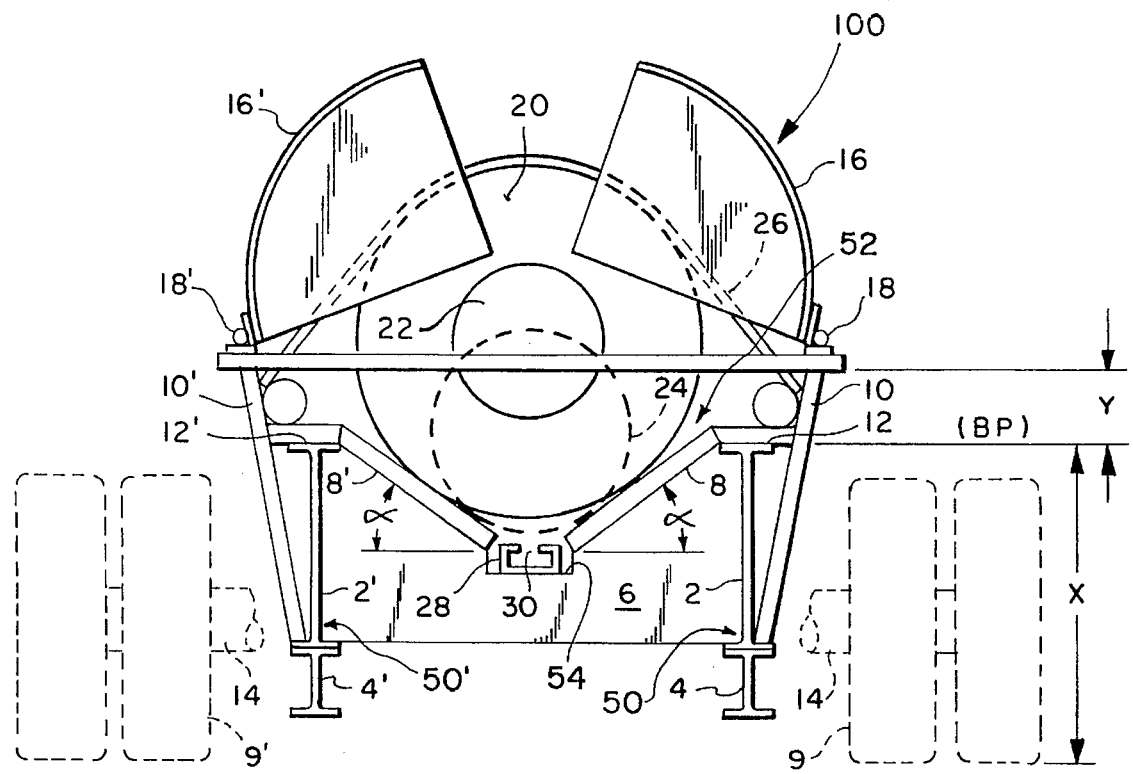
FIG. 1 is an end view of an embodiment of the trailer of the invention referenced by numeral 100.

Trailer 100 of FIG. 1 is a low boy type trailer for which the cargo transporting section has been lowered between the front and rear axles which is illustrated in FIG. 1 by a portion 50 and 50' of frame members 2 and 2' being below the center line of axle 14 of wheels 9 and 9'. Trailer 100 may be integral with its engine driving unit but is charateristically a trailer that is pulled by a heavy duty truck cab by means of a fifth wheel connection therebetween well known to those skilled in the art of truck-trailer combinations.

Trailer 100 has a pair of longitudinally extending frame members 2 and 2' that are secured in substantially parallel, spaced-apart relationship to each other by a plurality of spaced cross members referenced by numeral 6 in the FIGURES.

Figure 2:
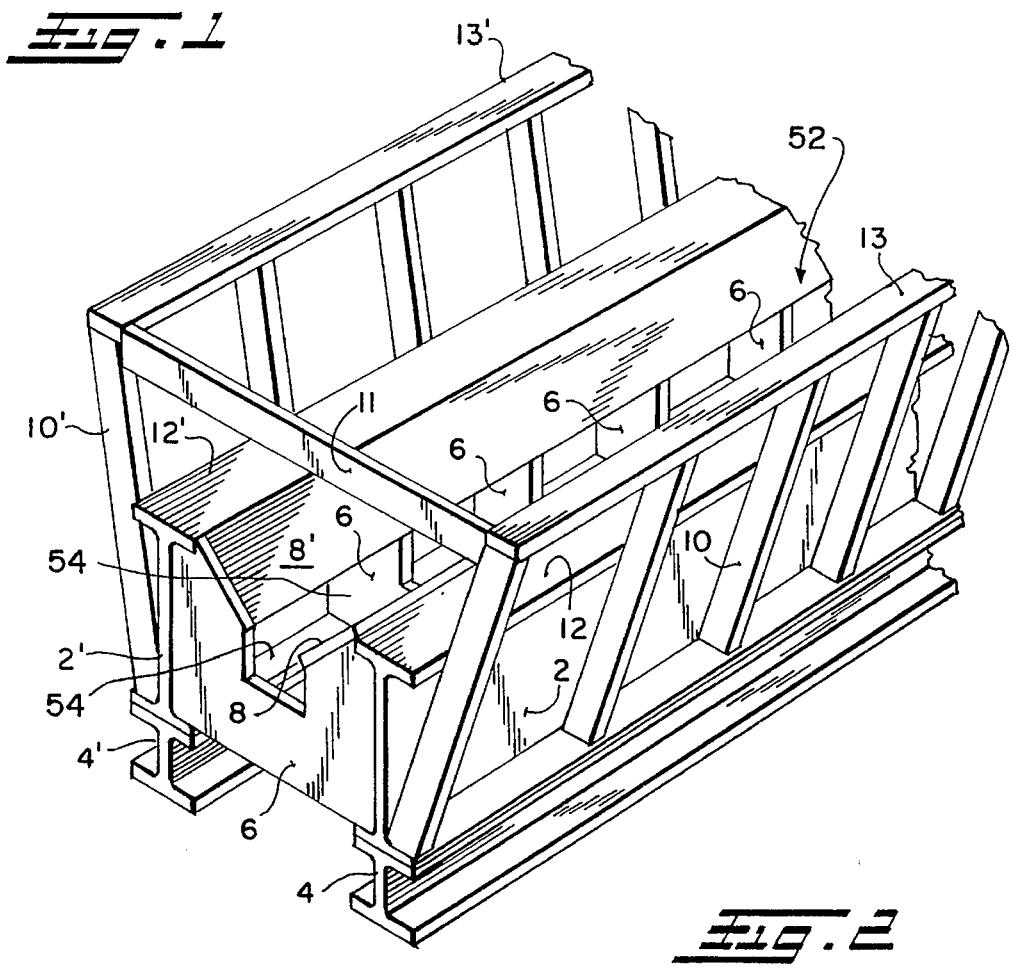
FIG. 2 is a partial perspective view of a portion of trailer 100 of FIG. 1.
Figure 3:
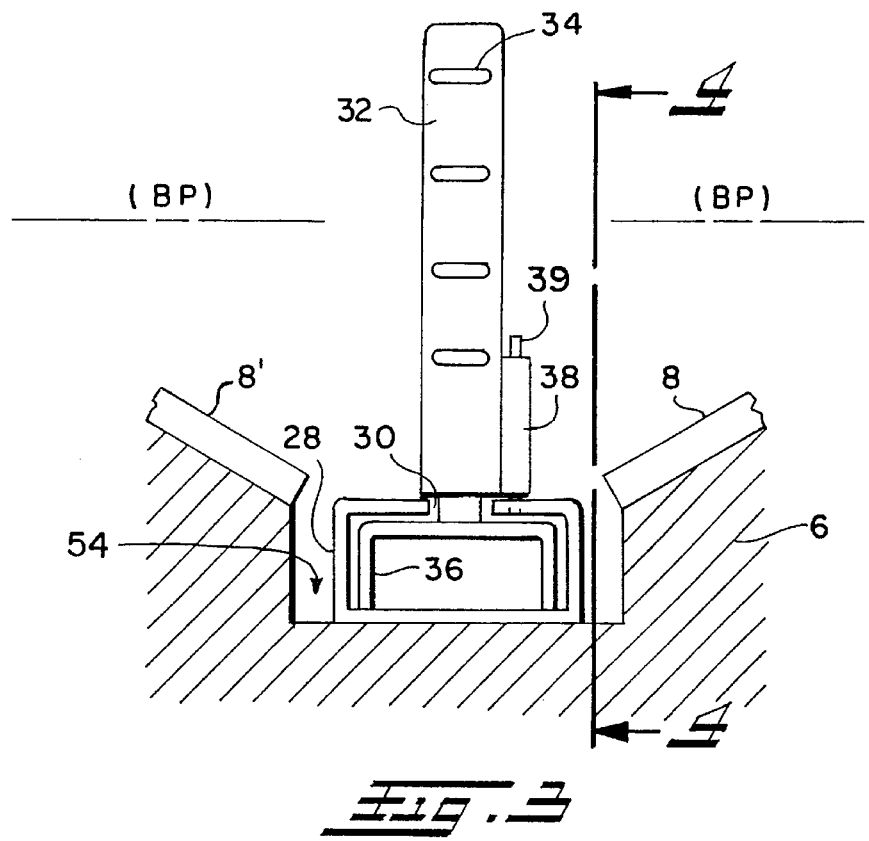
FIG. 3 is an end view of a bar 32 for use in preventing coils 20 being transported by trailer 100 of FIG. 1 from telescoping.

Frame members 12 and 12' are preferably in the form of metal I beams and may themselves be secured to respective aligned I beam frame members such as referenced by numerals 4 and 4' in FIGS. 2 and 3 for additional strength due to the characteristically heavy weight of metal coils being transported by the trailer that can weigh up to 60,000 pounds each concentrated in a six foot square area. As used herein the term "longitudinally extending frame members" includes aligned combinations of frame members such as frame members 2 and 4 and 2' and 4' as well as singular aligned frame members having sufficient strength to support the coils and structural portions of the trailer.

The frame and cross members comprise the support structure that is suspended on the wheel axles such as by coil and/or leaf spring suspension systems (not shown).

By definition, frame members 2 and 2' have respective corresponding surfaces 12 and 12' that define the bed plane extending therebetween referenced by (BP) in FIG. 1. Bed plane (BP) is the plane in which the bed of trailer 100 would be limited were it to have a bed for ordinarily the bed of trailer 100 would rest upon and extend between surface 12 and 12' or some other corresponding surfaces on frame members 2 and 2'. As used herein "bed plane" thus means the plane in which the theoretical bed of the trailer would lay had it a bed and that the bed plane remains at a distance "X" in substantial parallel relationship to the ground or road over which the trailer is moving.

Cross members 6 are likewise characteristically metal I beams that cooperate with frame members 2 and 2' to support the load being transported by the trailer. Cross members 6 are adapted to support at least one pair of longitudinally extending spaced-apart support members 8 and 8' that extend upwardly away from each other towards bed plane (BP) in substantial parallel relationship to each other as shown in FIGS. 1 and 2 to provide a trough 52 therebetween that is in substantial parallel alignment with support frame members 2 and 2' and 4 and 4'.

Support members 8 and 8' are made from a material that can withstand the weight of the coil(s) and would not tend to damage the outermost coil surface. Support members 8 and 8' may for example be made from a suitable wood, preferably a hard wood or a suitable steel that is preferably covered by rubber or the like to protect the coils as well as to aid in preventing them from slipping. It has been found that a preferred width along cross members 6 of the space between the closest edges of support members 8 and 8' is about 12½ inches. The center of the space between support members 8 and 8' is preferably located at the midpoint of cross members 6 between frame members 2 and 2' and that support members 8 and 8' respectively extend angularly upwardly away therefrom towards bed plane (BP) at an alpha angle (∝) of about 35°.

As shown in FIG. 1 support members 8 and 8' are respectively operative to engage a peripheral surface of coil 20 below bed plane (BP). In doing so, the ability of trailer 100 to prevent accidental dislodgment of coil 20 is greatly enhanced.

Coil 24 (shown in dashed line) illustrates that coils having a broad range of diameters may be transported in the trough formed by support members 8 and 8' and have a portion of their respective peripheral surfaces engaged by support members 8 and 8' below bed plane (BP).

As shown in FIG. 1, support members 6 may each be notched in the space between support members 8 and 8' to support a longitudinally open-sided channel 28 aligned as in substantial parallel relationship with support under bars 8 and 8'. The open side 30 of channel 28 faces upwardly towards bed plane (BP) and the notch 54 is deep enough to provide sufficient clearance between channel 28 and the smallest diameter coil to be transported by the trailer. It has been found that a notch 54 having a depth of about 4½ inches can accommodate the smallest of flat metal coils commonly made and up to coils having diameters of 72 inches to 78 inches or more.

Figure 4:
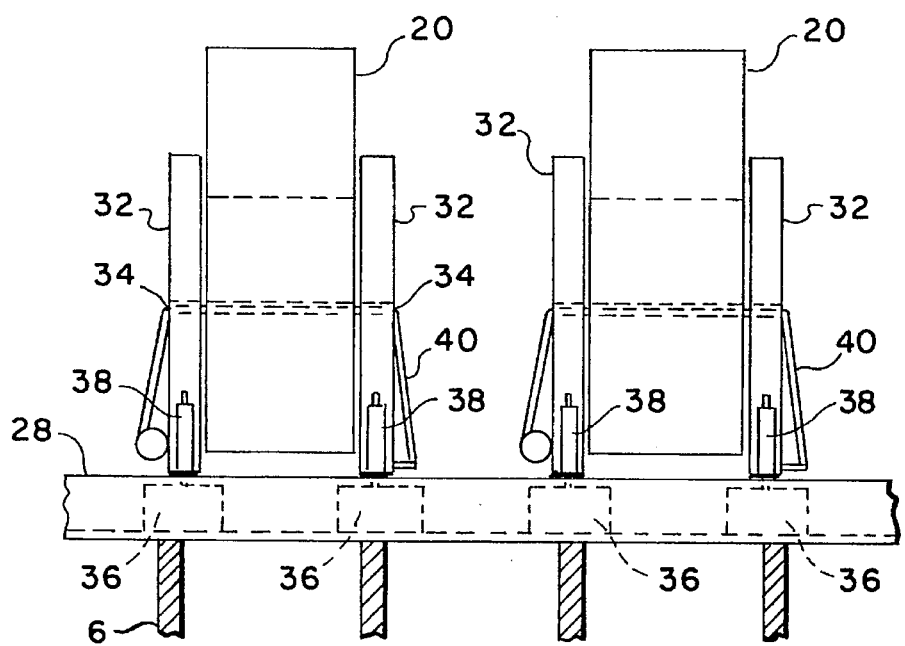
FIG. 4 is a side view of a plurality of spaced bars 32 of FIG. 3.

Channel 28 is operative to cooperate in providing one means by which to prevent the coils from telescoping as hereinafter described in greater detail with respect to FIGS. 3 and 4.

Returning to FIG. 1, trailer 100 preferably includes a containment structure such as the combination referenced by numerals 10 and 10' that features a plurality of struts and the like such as shown in FIGS. 1 and 2 and which preferably include at least one brace member such as referenced by numeral 11 in FIG. 2 that extends between containment structures 10 and 10'.

Containment structures 10 and 10' are respectively secured to frame 2 and 2' respective and extend upwardly towards bed plane (BP) and end at a predetermined distance "Y" thereabove in a manner enabling coil 20 to be supported in the trough formed by support members 8 and 8' therebetween. Containment structures 10 and 10' and brace member 11 form a cage-like structure about coil 20 that ends at end surfaces 13 and 13' a predetermined distance "Y" above bed plane (BP). End surfaces 13 and 13' are preferably longitudinally extending surfaces that face upwardly away from and are in substantial parallel alignment with bed plane (BP).

Trailer 100 preferably includes a cover having at least one section pivotally connected to either surface 13 or 13'. More preferably the covering is provided by two sections referenced by numerals 16 and 16' in FIG. 1 that are respectively pivotally connected to surfaces 13 and 13' (not referenced in FIG. 1) by pivot connections 18 and 18' respectively.

Cover sections 16 and 16' provide a clam shell type protective covering over coil 20 and are preferably made from fiberglass to minimize weight while providing toughness and the ability to protect coil 20 from stones and rain and the like while being transported. Although not shown in the drawings, trailer 100 may further include mechanisms for opening and closing cover sections 16 and 16'. Sections 16 and 16' may both, for example, be pivotally connected to one side of the trailer with one operative to pivot within the other before pivoting or otherwise removing both from the trailer by a crane or the like.

Coil 20 is releasably secured in the trough 52 formed by support members 8 and 8' by a flexible member such as a flexible strap referenced by numeral 26 that engages a peripheral portion of coil 20 above bed plane (BP). Strap 26 is preferably in the form of webbing or belting having suitable strength characteristics.

Strap 26 may be secured to support frames 2 and 2' and or containment structures 10 and 10' in any suitable manner that secures coil 20 in the trough formed by support members 8 and 8'.

FIG. 3 shows one means by which coil 20 is prevented from telescoping by use of bar members 32 that are positioned along channel 28 to extend upwardly therefrom on opposite sides of coil 20 as shown in FIG. 3.

Bar members 32 are adapted to extend through opening 30 in channel 28 and are secured to the back of an inverted channel 36 that is slidable along channel 28. Bar members 32 are provided with means for releasably locking Them at predetermined locations along channel 28 positions adjacent opposite sides of coil 20. One means by which to lock bar member 32 to channel 28 is to affix pin holders 38 to bars 32 that hold pins 39 operative to extend downwardly through holes in the upper surface of channel 28 (not shown) that are spaced along channel 28 to provide the locking positions desired along channel 28.

Bar members 32 are preferably provided with a plurality of slots therethrough (one referenced by numeral 34). Slots 34 are spaced at predetermined locations along bar 32 so that a flexible member such as a strap 40 can extend through the center of a coil being transported by trailer 100 and through the slots 34 of the bar members 32 positioned on opposite sides of coil 20 as shown in FIG. 4. Strap 40 is then secured tightly between bars 32 to draw them together on opposite sides of coil 20 to prevent coil 20 from telescoping during transport.

What is claimed is:

1. An improved over-the-road trailer for hauling a coil, having first and second spaced apart wheels and a central axle, the first wheel having a predetermined height, the second wheel having a predetermined height that is substantially equal to the predetermined height of the first wheel, and the central axle being located below the predetermined height of the first wheel and extending between the first wheel and the second wheel, wherein the improvement comprises:

a first longitudinally extending frame member having a portion located below the central axle, a second longitudinally extending frame member spaced apart from and substantially parallel to said first longitudinally extending frame member and having a portion located below the central axle, each of said first and second longitudinally extending frame members having a substantially horizontal surface defining a bed plane elevated above a road surface to a distance at least equal to the height of the first and second wheels, the bed plane being substantially parallel with the road surface;

a first cross member extending between and secured to said first and second frame members;

a first notch centrally positioned on said first cross member, said first notch being positioned below the height of the first and second wheels and having a predetermined width and a predetermined depth;

a second cross member extending between and secured to said first and second frame members, said second cross member being substantially parallel to said first cross member;

a second notch centrally positioned on said second cross member, said second notch being positioned below the height of the first and second wheels and having a predetermined width substantially equal to said predetermined width of said first notch, and having a predetermined depth substantially equal to said predetermined depth of said first notch, said second notch being substantially collinear with said first notch;

a first support member secured to said first frame member and extending angularly downward from said first frame member towards the central axle, said first support member being supported by said first and second cross members; and a second support member secured to said second frame member and extending angularly downward from said second frame member towards the central axle, said second support member being supported by said first and second cross members, said first and second support members defining a longitudinal trough extending therebetween, said trough being located at least partially below the height of the first and second wheels, wherein a peripheral portion of the coil is engaged within said trough below said bed plane by said first and second support members.

2. The trailer of claim 1 wherein said predetermined width of said first notch is on the order of twelve inches.

3. The trailer of claim 1 wherein said predetermined depth of said first notch is on the order of four inches.

4. The trailer of claim 1 further comprising anti-telescoping means for preventing the coil from telescoping, said anti-telescoping means being positioned within said first and second notches.

5. The trailer of claim 4 wherein said anti-telescoping means comprises a channel member positioned within said first and second notches and having an open side facing upwardly toward said bed plane and a first bar slidingly engaging said open side of said channel member and extending upwardly from said channel member toward said bed plane.

6. The trailer of claim 5 wherein said anti-telescoping device further comprises securing means for securing said first bar member at a pre-determined position along said channel member.

7. The trailer of claim 5 wherein said anti-telescoping device further comprises a second bar member slidably engaging said open side of said channel member and extending upwardly from said channel member toward said bed plane.

8. The trailer of claim 7 wherein said anti-telescoping device further comprises securing means for securing said first bar member at a first pre-determined position along said channel member and for securing said second bar member at a second predetermined position along said channel member.

9. The trailer of claim 8 wherein said first predetermined position is located along a first side of the coil and said second predetermined position is located along a second side of the coil.

10. The trailer of claim 8 wherein said anti-telescoping device further comprises a flexible member extending through a central portion of the coil and secured to said first and second bar members.

11. An improved over-the-road trailer for hauling a coil, having first and second spaced apart wheels and a central axle, the first wheel having a predetermined height, the second wheel having a predetermined height that is substantially equal to the predetermined height of the first wheel, and the central axle being located below the predetermined height of the first wheel and extending between the first wheel and the second wheel, wherein the improvement comprises:

a first longitudinally extending frame member having a portion located below the central axle, a second longitudinally extending frame member spaced apart from and substantially parallel to said first longitudinally extending frame member and having a portion located below the central axle, each of said first and second longitudinally extending frame members having a substantially horizontal surface defining a bed plane elevated above a road surface to a distance at least equal to the height of the first and second wheels, said bed plane being substantially parallel with the road surface;

a first cross member extending between and secured to said first and second frame members;

a first notch centrally located on said first cross member and positioned below the height of the first and second wheels;

a second cross member extending between and secured to said first and second frame members, said second cross member being substantially parallel to said first cross member;

a second notch centrally located on said second cross member and positioned below the height of the first and second wheels, said second notch being substantially collinear with said first notch;

a first support member secured to said first frame member and extending angularly downward from said first frame member towards said first and second notches, said first support member being supported by said first and second cross members;

a second support member secured to said second frame member and extending angularly downward from said second frame member towards said first and second notches, said second support member being supported by said first and second cross members, said first and second support members defining a longitudinal trough extending therebetween, said trough being located at least partially below the height of the first and second wheels, wherein a peripheral portion of the coil is engaged within said trough below said bed plane by said first and second support members; and a first elongated containment structure secured to said first frame member and extending above said first frame member to a first end surface located at a first predetermined distance above said bed plane, a second elongated containment structure secured to said second frame member and extending above said second frame member to a second end surface located at second predetermined distance above said bed plane, said first predetermined distance being substantially equal to said second predetermined distance.

12. The trailer of claim 11 further comprising a cover pivotally connected to one of said first and second containment structures and operative to a cover a portion of the coil.

13. The trailer of claim 11 further comprising a first cover portion and a second cover portion, said first cover portion being pivotally connected to said first containment structure and operative to cover a first portion of the coil, said second cover portion being pivotally secured to said second containment structure and operative to cover a second portion of the coil.

14. An improved over-the-road trailer for hauling a coil, having first and second spaced apart wheels and a central axle, the first wheel having a predetermined height, the second wheel having a predetermined height that is substantially equal to the predetermined height of the first wheels, and the central axle being located below the predetermined height of the first wheel and extending between the first wheel and the second wheel, wherein the improvement comprises:

- a first longitudinally extending frame member having a portion located below the central axle, a second longitudinally extending frame member spaced apart from and substantially parallel to said first longitudinally extending frame member and having a portion located below the central axle, each of said first and second longitudinally extending frame members having a substantially horizontal surface defining a bed plane elevated above a road surface to a distance at least equal to the height of the first and second wheels, said bed plane being substantially parallel with the road surface;
- a first cross member extending between and secured to said first and second frame members;
- a first notch centrally positioned on said first cross member and located below the height of the first and second wheels;
- a second cross member extending between and secured to said first and second frame members, said second cross member being substantially parallel to said first cross member;
- a second notch centrally positioned on said second cross member and located below the height of the first and second wheels, said second notch being substantially collinear with said first notch;
- anti-telescoping means for preventing the coil from telescoping, said anti-telescoping means being positioned within said first and second notches;
- a first support member secured to said first frame member and extending angularly downward from said first frame member towards said first and second notches, said first support member being supported by said first and second cross members;
- a second support member secured to said second frame member and extending angularly downward from said second frame member towards said first and second notches, said second support member being supported by said first and second cross members, said first and second support members defining a longitudinal trough extending therebetween, said trough being located at least partially below the height of the first and second wheels, wherein a peripheral portion of the coil is engaged within said trough below said bed plane by said first and second support members; and
- a first elongated containment structure secured to said first frame member and extending above said first frame member to a first end surface located at a first predetermined distance above said bed plane, a second elongated containment structure secured to said second frame member and extending above said second frame member to a second end surface located at second predetermined distance above said bed plane, said first predetermined distance being substantially equal to said second predetermined distance.

15. The trailer of claim 14 wherein said anti-telescoping means comprises a channel member positioned within said first and second notches and having an open side facing upwardly toward said bed plane and a first bar member slidingly engaging said open side of said channel member and extending upwardly from said channel member toward said bed plane.

16. The trailer of claim 15 wherein said anti-telescoping device further comprises securing means for securing said first bar member at a pre-determined position along said channel member.

17. The trailer of claim 15 wherein said anti-telescoping device further comprises a second bar slidably engaging said open side of said channel member and extending upwardly from said channel member toward said bed plane.

18. The trailer of claim 17 wherein said anti-telescoping device further comprises securing means for securing said first bar member at a first pre-determined position along said channel member and for securing said second bar member at a second predetermined position along said channel member.

19. The trailer of claim 18 wherein said first predetermined position is located along a first side of the coil and said second predetermined position is located along a second side of the coil.

20. The trailer of claim 17 wherein said anti-telescoping device further comprises a flexible member extending through a central portion of the coil and secured to said first and second bar members.

* * * * *